(12) United States Patent
Kojima (10) Patent No.: US 7,349,023 B2
(45) Date of Patent: Mar. 25, 2008

(54) CAMERA-INTEGRATED VIDEO RECORDING AND REPRODUCING APPARATUS, AND RECORD CONTROL METHOD THEREOF

(75) Inventor: Masaaki Kojima, Tokyo (JP)

(73) Assignee: Sony Corporation, Tokyo (JP)

( * ) Notice: Subject to any disclaimer, the term of this patent is extended or adjusted under 35 U.S.C. 154(b) by 674 days.

(21) Appl. No.: 10/343,881

(22) PCT Filed: May 30, 2002

(86) PCT No.: PCT/JP02/05266

§ 371 (c)(1),
(2), (4) Date: Jul. 28, 2003

(87) PCT Pub. No.: WO02/102085

PCT Pub. Date: Dec. 19, 2002

(65) Prior Publication Data

US 2004/0008772 A1    Jan. 15, 2004

(30) Foreign Application Priority Data

Jun. 7, 2001    (JP)    ............................ 2001-172640

(51) Int. Cl.
*G03B 7/00* (2006.01)
(52) U.S. Cl. .............. 348/362; 384/231.99; 384/231.6; 380/217; 392/166; 392/232
(58) Field of Classification Search ................ 382/232, 382/166; 380/217; 348/231.99, 231.6
See application file for complete search history.

(56) References Cited

U.S. PATENT DOCUMENTS

| | | | | |
|---|---|---|---|---|
| 5,221,963 A | * | 6/1993 | Hashimoto et al. | ......... 348/234 |
| 5,237,363 A | * | 8/1993 | Okada et al. | .................. 396/55 |
| 5,446,504 A | * | 8/1995 | Wada | .......................... 348/645 |
| 5,486,931 A | * | 1/1996 | Kim et al. | ..................... 386/73 |
| 5,631,699 A | | 5/1997 | Saito | |
| 5,754,227 A | * | 5/1998 | Fukuoka | ................... 348/231.6 |
| 5,835,138 A | * | 11/1998 | Kondo | ................... 348/207.99 |
| 5,943,512 A | * | 8/1999 | Hamada et al. | ................ 396/55 |
| 6,078,751 A | | 6/2000 | Yamazaki et al. | |
| 6,404,776 B1 | * | 6/2002 | Voois et al. | ................. 370/468 |
| 6,804,451 B1 | * | 10/2004 | Ko et al. | ....................... 386/83 |
| 6,850,271 B1 | * | 2/2005 | Ichikawa | .................. 348/207.2 |

FOREIGN PATENT DOCUMENTS

| | | |
|---|---|---|
| JP | 5-130602 | 5/1993 |
| JP | 5-300506 | 11/1993 |

(Continued)

*Primary Examiner*—David Ometz
*Assistant Examiner*—Usman Khan
(74) *Attorney, Agent, or Firm*—Frommer Lawrence & Haug LLP; William S. Frommer; Thomas F. Presson (57) ABSTRACT

A video recording/reproducing apparatus combined with a camera adapted to control a target information amount according to the nature and properties of an animated image to be photographed, and a recording control method for the same are provided. A target information amount control microcomputer (7) controls an encoding and compressing apparatus (10) by a target bit rate to carry out predetermined compressive encoding on the animated image data from a filter computing unit (4) so as to create an encoded bit stream. The filter computing unit (4) is given a filter coefficient to convert the animated image data into data of a resolution that is suited for encoding.

4 Claims, 8 Drawing Sheets

FOREIGN PATENT DOCUMENTS

| | | |
|---|---|---|
| JP | 6-22193 | 1/1994 |
| JP | 8-84327 | 3/1996 |
| JP | 11-41515 | 2/1999 |
| JP | 11-187309 | 7/1999 |
| JP | 313322 | 11/1999 |
| JP | 2001-36904 | 2/2001 |
| JP | 2001-86510 | 3/2001 |
| WO | WO 97/04597 | 2/1997 |

* cited by examiner

CAMERA-INTEGRATED VIDEO RECORDING AND REPRODUCING APPARATUS, AND RECORD CONTROL METHOD THEREOF

TECHNICAL FIELD

The present invention relates to a video recording/reproducing apparatus combined with a camera for compressively encoding photographed images, and then recording the signals of the images in a predetermined recording medium. More particularly, the invention relates to a recording control method for a video recording/reproducing apparatus combined with a camera adapted to carry out compressive encoding of proper quality on the image data of an imaged object on the basis of imaging control data for setting imaging conditions in an imaging unit so as to implement optimum image control processing.

BACKGROUND ART

MPEG2 (Moving Picture Experts Group Phase 2) is an encoding system used for broadcasting and AV equipment, and extensively used as a technology for compressing information, such as images, sound, voice, and data.

A compressing and encoding apparatus of a standard model of MPEG2 makes it possible to achieve improved image quality after decompression, by encoding input images once to extract the complicacy and movement of an image mainly from the amount of generated information, and determining the characteristics of the image so as to conduct encoding control according to the characteristics.

However, the conventional encoding control based on the detection of movements has been presenting the following shortcoming when actual shooting situations are considered. For example, image correlation detection results do not show the difference between the shooting focused on a scene involving a considerable movement and the shooting of a non-attention drawing scene, such as a panning scene, that has a similar complexity to that of the scene involving a considerable movement.

Hence, if the compressing and encoding apparatus adapted to carry out the encoding control based on the movement detection is applied to the video recording/reproducing apparatus combined with a camera that uses a disk media having a limited recording capacity, then it is required to always allocate a maximum bit rate to every scene to be shot in order to maintain high quality of reproduced images. This undesirably shortens the time of recording in a disk medium.

An object of the present invention is to provide a video recording/reproducing apparatus combined with a camera adapted to carry out corrective control of a target information amount according to the nature and properties of an animated image to be photographed, and a recording control method for the same.

DISCLOSURE OF INVENTION

To this end, the present invention provides a video recording/reproducing apparatus combined with a camera that is adapted to compressively encode a photographed image and record an image signal in a predetermined recording medium. The video recording/reproducing apparatus combined with a camera in accordance with the present invention is constructed of a first controlling means for carrying out the drive of a video camera lens, the adjustment of exposure, and the detection of white balance or camera-shake to correct the image signal, a second controlling means for controlling the start and stop of shooting of the video camera, and a third controlling means for receiving a plurality of pieces of shooting control information output from the first and second controlling means, and determining the importance of a scene to be taken, and a shooting environment so as to set an optimum target information amount for the image signal to be recorded in the recording medium.

To supply a target information amount to an encoding and compressing apparatus, the video recording/reproducing apparatus combined with a camera according to the present invention primarily uses a recording mode signal, the information regarding a zoom lens position, a focus evaluation value, a camera-shake detection value, an iris in/out amount, a camera signal gain amount, and a white balance control amount as the input signals and input information to a target information amount control microcomputer, thus permitting a new target information amount to be set by taking an actual shooting situation into consideration.

BEST MODE FOR CARRYING OUT THE INVENTION

An embodiment in accordance with the present invention will now be described with reference to the accompanying drawings.

Figure 1:
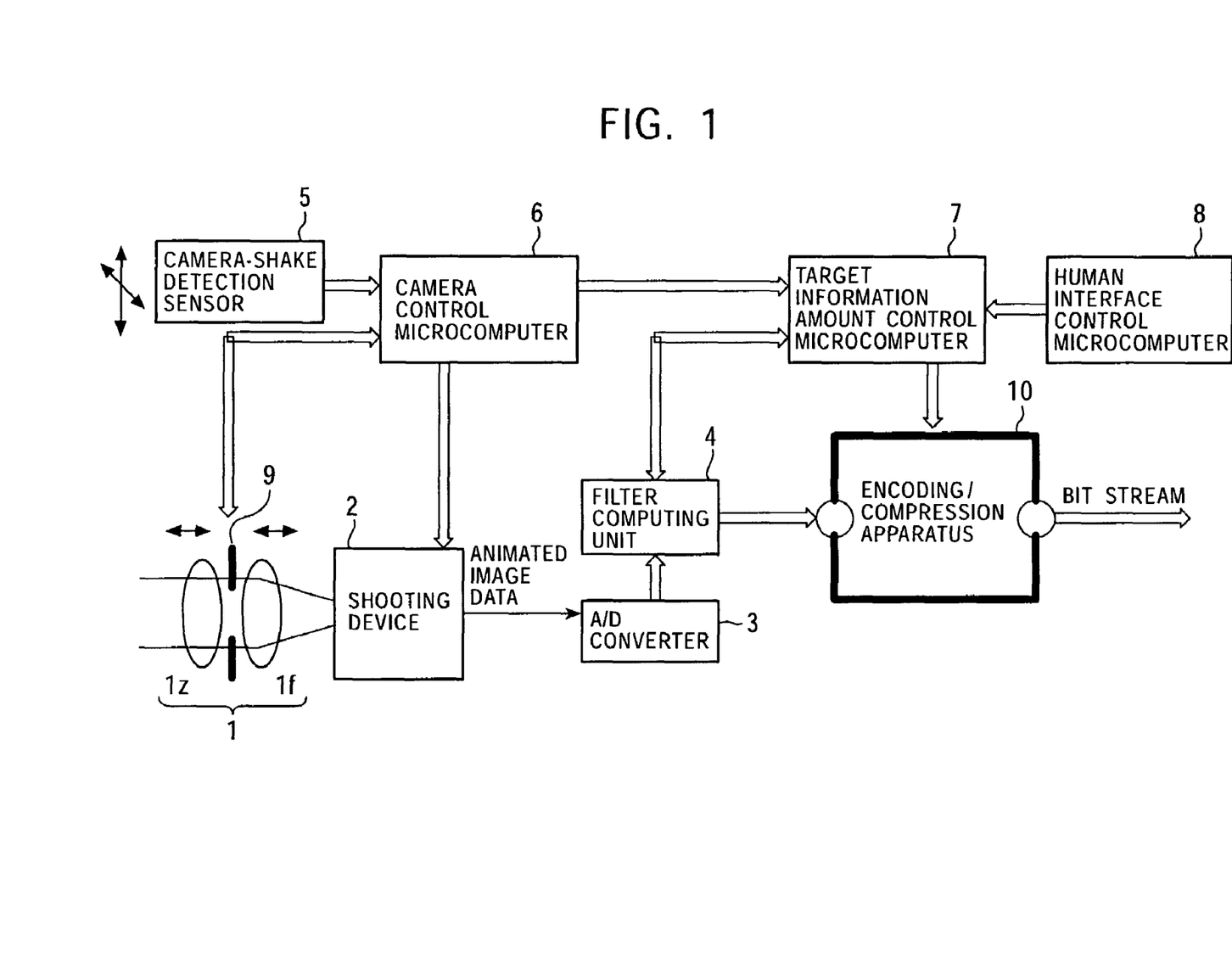
FIG. 1 is a block diagram showing a control model of a video recording/reproducing apparatus combined with a camera according to the present invention in accordance with the present invention.

FIG. 1 is a block diagram showing a control model of a video recording/reproducing apparatus combined with a camera that incorporates various control microcomputers or the like and an encoding and compressing apparatus.

A lens system 1 is constructed of a zoom lens 1z and a focus lens 1f. The light from an object is input to a shooting device 2 through the intermediary of the lens system 1. In the shooting device 2, an image of the object is taken out in terms of three picture signals corresponding to the three colors, RGB (red, green, and blue). At this time, the position of the lens system 1 is controlled such that it is always maintained focused on an object. The picture signal from the shooting device 2 is sent as an animated image data to the an A/D converter 3, and the A/D converter 3 converts the animated image data into digital data.

A filter computing unit 4 is constructed using a digital filter, and controls the passband characteristics of a frequency component by changing a filter coefficient thereby to effect predetermined frequency conversion. The animated image data is recorded in terms of a bit stream from an encoding and compressing apparatus 10 into a recording medium, such as a video tape, which is not shown.

A camera-shake sensor 5 outputs a camera-shake detecting signal by an angular velocity sensor or the like. A camera control microcomputer 6 performs camera-shake correction on the basis of the camera-shake detection signal so as to prevent deterioration of image quality. Furthermore, the camera control microcomputer 6 performs, in addition to the camera-shake correction, the control of an optical system in the shooting device 2 on the basis of a video input from the shooting device 2, a control output for optimally controlling the same, and a variety of signal inputs. Moreover, the camera control microcomputer 6 also carries out control of zooming or the like by driving the zoom lens $1z$ and the focus lens $1f$.

A target information amount control microcomputer 7 controls the encoding and compressing apparatus 10 by a target bit rate to carry out predetermined compression and encoding on the animated image data from the filter computing unit 4 so as to create an encoded bit stream. The filter computing unit 4 is given a filter coefficient to convert the animated image data into data of a resolution that is suited for encoding.

A human interface control microcomputer 8 controls the start and stop of recording and the information regarding the elapsed time of recording mainly by the inputs of operating switches from a user, and also controls display for the user.

In the lens system 1, an iris (aperture) 9 for adjusting exposure is disposed between the zoom lens $1z$ and the focus lens $1f$, and the amount of light from an object to be input to the shooting device 2 through the intermediary of the lens system 1 is adjusted by the camera control microcomputer 6.

As it will be described in detail hereinafter, the information from the camera control microcomputer 6, e.g., the information regarding the video camera lens position, the information regarding exposure adjustment, the information regarding white balance control, and the information regarding a camera-shake detected by the angular velocity sensor, is input to a target information amount control microcomputer 7. Furthermore, the information from a human interface control microcomputer 8, e.g., the information for controlling the start and stop of the videotaping of the video camera, is taken into consideration to instruct the encoding and compressing apparatus 10 to conduct optimum encoding control for a shooting scene, thereby recording more moving images with an optimum image quality in a recording medium with a limited recording capacity.

Figure 2:
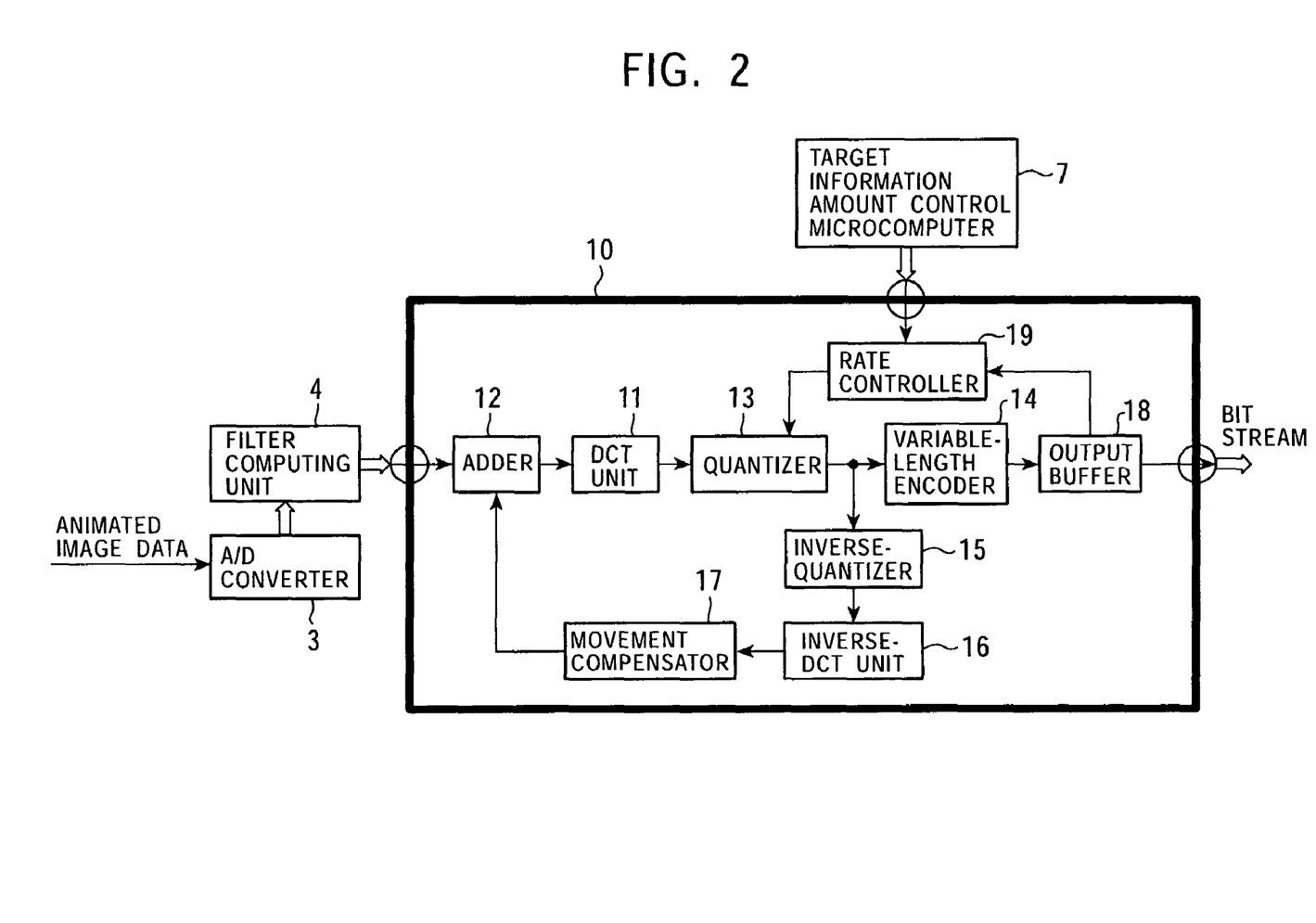
FIG. 2 is a block circuit diagram showing the construction of a standard model of MPEG2.

FIG. 2 is a block circuit diagram showing the construction of an MPEG2 standard model for compressing digital picture signals.

The encoding and compressing apparatus 10 outputs a bit stream obtained by encoding animated image data supplied from the A/D converter 3 through the intermediary of the filter computing unit 4. More specifically, a discrete cosine transform (DCT) unit 11 constituting the encoding and compressing apparatus 10 is configured to carry out discrete cosine transformation on the animated image data supplied through the intermediary of an adder 12 that performs difference computation, and supplies the processed data to a quantizer 13. The quantizer 13 quantizes the image data from the DCT unit 11 and supplies the quantized image data to a variable-length encoder 14 and an inverse-quantizer 15.

The inverse-quantizer 15 inversely quantizes the quantized image data supplied from the quantizer 13, and supplies the processed data to an inverse-DCT unit 16. The inverse-DCT unit 16 carries out inverse-DCT on the inversely quantized image data from the inverse-quantizer 15, then supplies the processed data to a movement compensator 17. The movement compensator 17 carries out movement compensation on the image data, and supplies the processed data to the adder 12.

The variable-length encoder 14 carries out variable-length encoding on the image data from the quantizer 13, and supplies the processed image data to an output buffer 18. The output buffer 18 temporarily stores the image data from the variable-length encoder 14, and then supplies the image data to a rate controller 19 that controls quantizing rate. The rate controller 19 supplies a rate control signal for controlling the quantizing rate to the quantizer 13 on the basis of a compression control signal from the target information amount control microcomputer 7.

In the encoding and compressing apparatus 10 constructed as described above, the encoding control is carried out such that a target information amount from the target information amount control microcomputer 7 is met, permitting efficient, highly compressed bit streams to be output. As previously described, however, the conventional video recording/reproducing apparatus combined with a camera has been designed to merely extract the complexity and characteristics of images in the encoding and compressing apparatus 10. Therefore, when an actual shooting situation is considered, it has been impossible to distinguish between the image data of a scene with a really considerable movement and the image data of a non-attention drawing scene, such as a panning scene, having a similar complexity to that of the scene with a big movement.

In supplying a target information amount to an encoding and compressing apparatus 10, the video recording/reproducing apparatus combined with a camera according to the present invention solves the problem with the prior art by primarily using a recording mode signal, the information regarding a zoom lens position, a focus evaluation value, a camera-shake detection value, an iris in/out amount, a camera signal gain amount, and a white balance control amount as the input signals, and supplying the information to the target information amount control microcomputer 7 so as to set a new target information amount by taking an actual shooting situation into consideration. More specifically, for an attention-drawing scene involving a considerable movement, no band restriction is performed by the filter computing unit 4, and an adequate bit rate for maintaining image quality can be allotted. When a non-attention drawing image data, such as that during panning, is being input, the importance of the recorded picture is considered low. In such a case, therefore, it is effective to perform recording by restricting the band by the filter computing unit 4 and to control the bit rate to be low so as to prevent image quality from deteriorating even at a low bit rate.

The diverse types of control microcomputers 6, 7, and 8 discussed above can be expected to provide similar effect even if they are incorporated in a single IC or microcomputer.

The operation for controlling a target information amount in compressing an image in the foregoing video recording/reproducing apparatus combined with a camera will now be described in detail.

Figure 3:
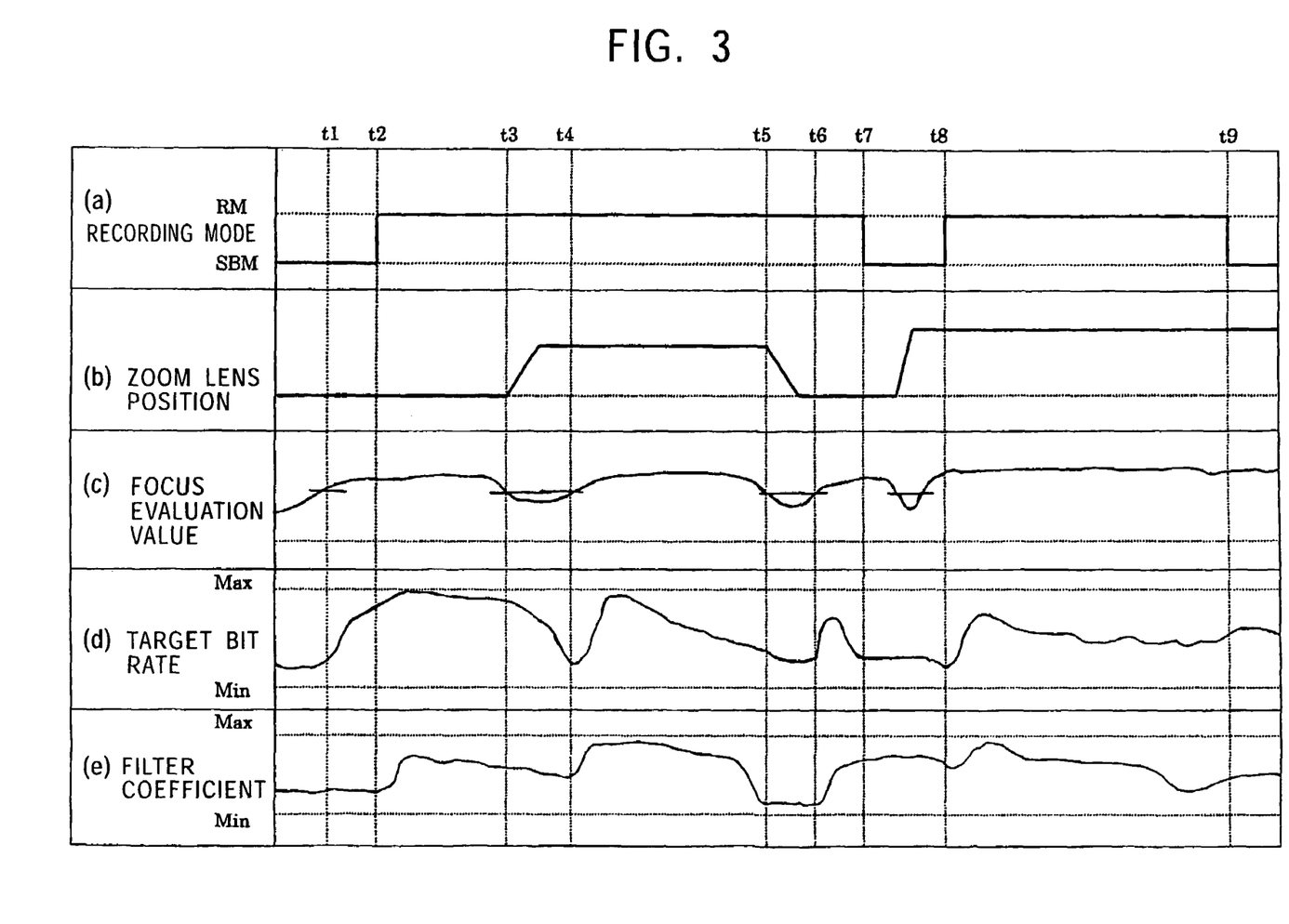
FIG. 3 is a timing chart showing an example of target information amount control.

FIG. 3 is a timing chart showing an example of the control of a target information amount. ($a$) through ($c$) of the figure illustrate the condition information to be input to the target information amount control microcomputer 7, and ($d$) and ($e$) illustrate the target bit rates output from the target information amount control microcomputer 7 and the command signals of filter coefficients, respectively.

FIG. 3(a) shows the switching of recording mode signals.

The recording mode signals are decided on the basis of the operation by a user through the human interface control microcomputer 8. The recording mode signals are classified into two operation modes, namely, a recording mode RM and a standby mode SBM. In the recording mode RM, image signals are recorded in a recording medium. In the standby mode SBM, no recording is performed although camera images are output. At time t2, the standby mode SBM is switched to the recording mode RM, and the recording mode continues until time t7. Thereafter, the standby mode SBM continues until time t8, then the recording mode RM restarts from time t8 and lasts until time t9.

FIG. 3(b) illustrates the changes in the position of the zoom lens, and (c) of the figure illustrates the changes in focus evaluation value.

A zoom lens position signal is a signal output from the camera control microcomputer 6 on the basis of the lens position changed by an operation by a user. The lens position can be changed manually or electrically within a zooming range from a telephotographic distance (maximum focal length) to a wide-angle distance (minimum focal length) in the ordinate direction. In the timing chart of FIG. 3(b), the movement of the zoom lens in the middle of zooming is indicated by the inclined lines in the zooming range. At time t3, the user switches the lens position from a wide-angle distance to a telephotographic distance during recording, then switches back to a wide-angle distance at time t5.

The focus evaluation value indicates an evaluated contrast of a picture projected on an imaging device, such as a CCD, of the shooting device 2 when the camera control microcomputer 6 moves a focus lens f1, and it is represented as a normalized numeral value. In this case, the focusing operation of the focus lens means that control is carried out to increase the evaluation value. By achieving focusing to raise the contrast, the picture projected becomes sharper. In the standby mode SBM before time t1, and in a zooming mode from time t3 to t4, and from time t5 to t6, the focus evaluation value is lower than an optimum contrast because the lens is in the middle of focusing.

The target bit rate shown in FIG. 3(d) is set as a parameter with respect to the encoding and compressing apparatus 10 of the MPEG2 standard model that is determined on the basis of input signals and input information according to a control algorithm of the target information amount control microcomputer 7. In the MPEG2 standard model, the internal computation performed therein is changeably controlled such that a bit stream computation result to be output is close to the aforesaid set value.

The filter coefficient shown in FIG. 3(e) is a parameter of a filter computing unit that carries out filtering on a vide signal before it is input to the encoding and compressing apparatus 10 of the MPEG2 standard model that is determined on the basis of input signals and input information according to a control algorithm of the target information amount control microcomputer 7. By setting the filter coefficient to a smaller value, the resolution in the filter computation can be reduced. This makes it possible to decrease the information amount of a picture to be output without the need for lowering a target bit rate.

In general, human eyes are characterized in that the gazing intensity is lowered than normal while sight line is moving, so that minimum necessary sharpness of an image is input. This is to minimize fatigue or uncomfortableness. Hence, it may be assumed that the degree of attention paid to an image is lower during the zooming from time t3 to t4 or the like and during an attempt to achieve focusing.

More specifically, under such a shooting condition, there is no need to obtain a sharp picture with a resolution that is higher than necessary. For this reason, based on the condition information input to the target information amount control microcomputer 7 from the camera control microcomputer 6, the target bit rate is set to a low value, as shown in FIG. 3(d), and the filter coefficient is set to a small value, as shown in FIG. 3(e), thereby reducing the absolute amount of a bit stream.

Immediately after zooming, the degree of attention of a photographer generally increases because the frame (image frame) of an object has been changed. Hence, setting is made such that the target bit rate and the filter coefficient increase in the recording operation immediately following the completion of focusing at time t4 or time t6 or the like at which a focus evaluation value exceeds a threshold value. Thereafter, with the elapse of time, the average target information amount is decreased. This makes it possible to record more moving images with an optimum image quality in a recording medium with a limited recording capacity.

Figure 4:
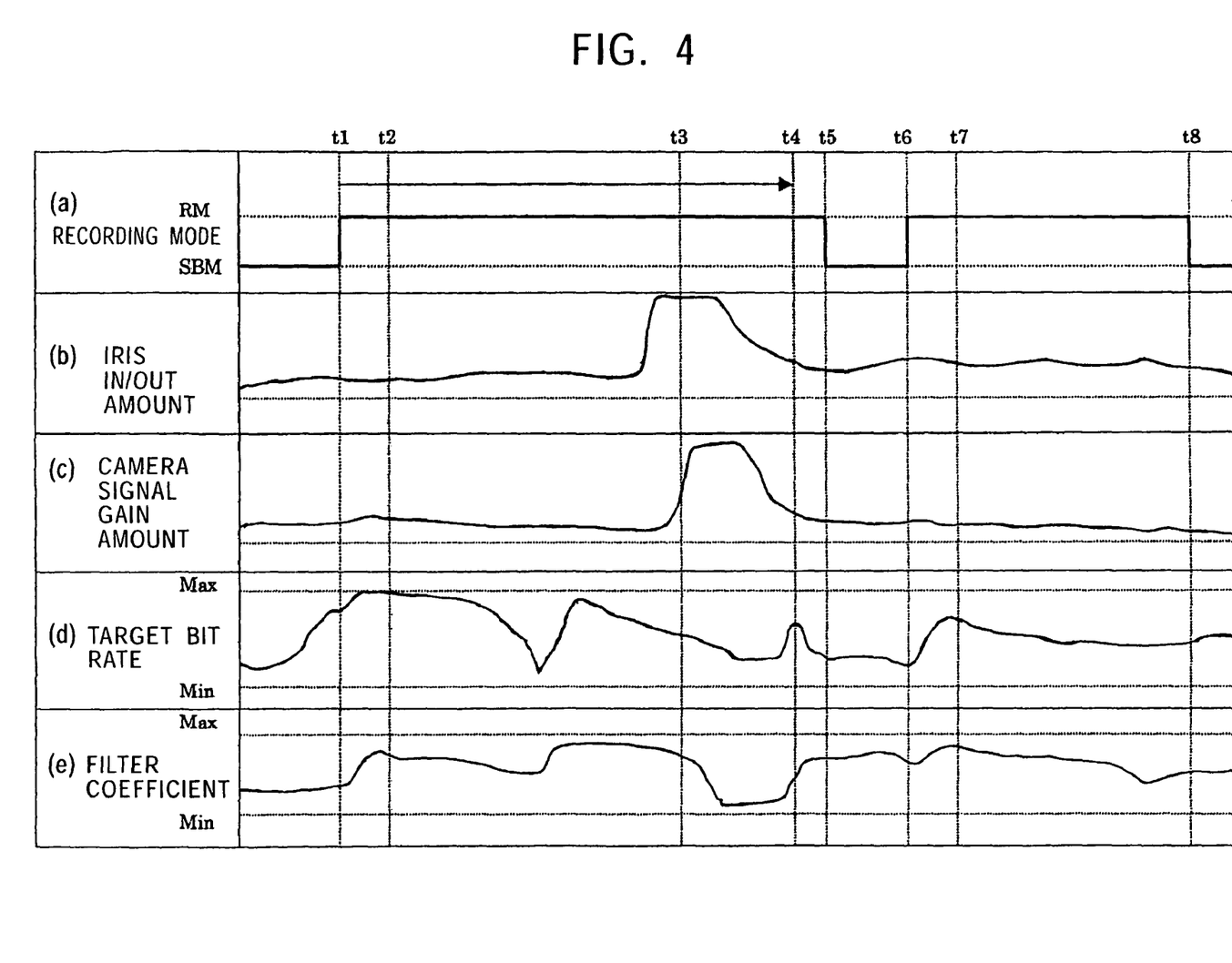
FIG. 4 is a timing chart showing an example of the target information amount control at low illuminance.

FIG. 4 is a timing chart showing an example of target information amount control at lower illuminance. As in the case shown in FIG. 3, FIGS. 4(a) through (c) of the figure illustrate the condition information to be input to the target information amount control microcomputer 7, and FIGS. 4(d) and (e) illustrate the target bit rates output from the target information amount control microcomputer 7 and the command signals of filter coefficients, respectively.

FIG. 4(a) shows the switching of recording mode. At time t1, the standby mode SBM is switched to the recording mode RM, and the recording mode continues until time t5. Thereafter, the standby mode SBM continues until time t6, then the recording mode RM restarts from time t6 and lasts until time t8.

In the case of a video recording/reproducing apparatus combined with a camera, recording is frequently started from the moment attention is focalized on a desired image. This is utilized to supply the information regarding continuous shooting time from the human interface control microcomputer 8 to the target information amount control microcomputer 7 so as to allocate a relatively large target information amount at time t1 or t6, which is immediately after the recording is started.

After that, when recording is continued, it is assumed that the degree of attention of a photographer and a viewer watching reproduced images gradually decreases with the lapse of an extended time. As previously mentioned, if the degree of attention paid to an image decreases, then the filter coefficient of the-filter computing unit 4 is changed and high frequency components are removed to lower a resolution so as to further enhance the compressing efficiency in the encoding and compressing apparatus 10 in subsequent stages. This allows deterioration of pictures to be restrained even at a lower bit rate. For this reason, after the recording mode lasts for a predetermined time from the start of recording, e.g., from time t4, the target information amount is controlled to lower an average target information amount.

FIG. 4(b) shows the changes of the iris in/out amount that changes on the basis of the information regarding the exposure of an object, and (c) of the figure shows the changes in a camera signal gain amount.

The iris in/out amount and the camera signal gain amount are both decided by the signal level of an image projected on an imaging device that is detected by the camera control microcomputer 6. In a standard video camera, the iris 9 fully opens in a dark room or the like. The camera signal gain amount is placed under gain-control such that a picture signal level provides an appropriate signal amount in a camera signal processing circuit (not shown) in the shooting apparatus 2.

Normally, in a video camera, when the gain of a camera signal processing circuit is increased, the noise components in signals increase accordingly. Therefore, in a dark room or the like, the iris in/out amount is adjusted to control a signal level, and after the iris fully opens, such control is carried out that the gain of the camera signal processing circuit is increased. If the iris is fully open and the camera signal gain amount is large, then the shooting can be said to be the one at low illuminance.

For instance, under a condition where the iris is fully open and the camera signal gain amount starts to increase at time t3 while recording, a picture is dark and an S/N is poor. Therefore, the image quality will be hardly affected even when the resolution is decreased and the bit rate is set to a lower value. Similarly, information is supplied from the camera control microcomputer 6 to the target information amount control microcomputer 7 to lower the bit rate and the deterioration of images is restrained.

Thus, in an environment of a low illuminance wherein the iris 9 is open and the gain of the shooting device 2 has been increased, it is possible to utilize the foregoing information regarding the correction of exposure supplied from the camera control microcomputer 6 thereby to properly control the target information amount.

Figure 5:
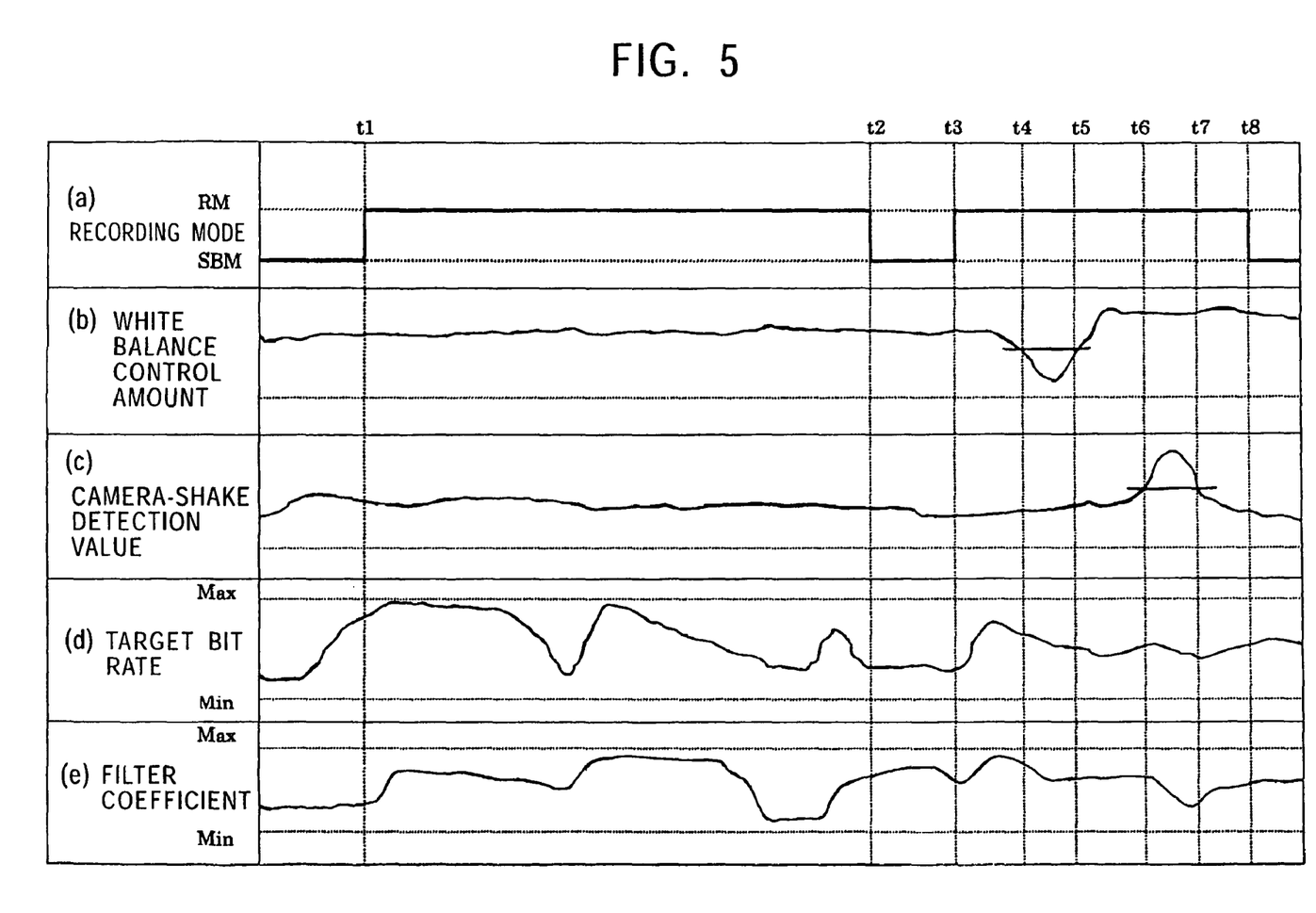
FIG. 5 is a timing chart showing an example of target information amount control when an abnormal white balance or a camera-shake is detected.

FIG. 5 is a timing chart showing an example of the target information amount control when an abnormal white balance or a camera-shake is detected. As in the case shown in FIG. 3, FIGS. 5(*a*) through (*c*) of the figure illustrate the condition information to be input to the target information amount control microcomputer 7, and (*d*) and (*e*) illustrate the target bit rates output from the target information amount control microcomputer 7 and the command signals of filter coefficients, respectively.

FIG. 5(*a*) shows a changeover of recording mode. At time t1, the standby mode SBM is switched to the recording mode RM, and the recording mode continues until time t2. Thereafter, the standby mode SBM continues until time t3, then the recording mode restarts from time t3 and lasts until time t8.

FIG. 5(*b*) shows changes in a white balance control amount.

The white balance control amount is determined by analyzing the color components of the signal of the picture projected on the imaging device, the analysis being performed by the camera control microcomputer 6. By the white balance control, the color component ratio of the camera signal processing circuit is controlled such that the sum of all three picture signals, which correspond to the three colors RGB (red, green, and blue), becomes white. However, there are cases where control balance cannot temporarily be attained due to the brightness of an object or a change of a light source in an environment, etc. As the value is larger, the control balance is better. FIG. 5 shows that an abnormal state occurs in the white balance control during the period from time t4 to t5.

When the information regarding white balance is utilized, if an evaluation value of white balance deviates from a black body radiation curve, then the image is determined to be unacceptable. This means that there is no need to record the image at a high bit rate. During the recording mode from time t3 to t8, if an abnormal white balance control amount is found at, for example, time t4, then the filter coefficient may be set to a small value to lower the resolution and the target bit rate may be set to be lower.

FIG. 5(*c*) illustrates the changes in camera-shake detection value.

The camera-shake detection value is determined on the basis of an output signal from the camera-shake detection sensor 5 provided in the vicinity of the lens system 1 of the video camera, and processed as a normalized value in the camera control microcomputer 6. It is recognized that the larger the value, the larger the shake of the lens.

To project a moving object or a panorama image by a video camera, the camera is horizontally and laterally moved to perform panning. In this case, as indicated by the period from time t6 to t7, for example, the camera-shake detection value will be a large value exceeding a threshold value. In a conventional camera control microcomputer, it is recognized by the correlation detection and the extraction of the characteristics of images in a time domain that a large movement of an object is involved even during the panning of a still landscape, and therefore, the target information amount instructed to the encoding and compressing apparatus 10 has been increased more than necessary.

In this case, the additional information indicating "in the middle of panning based on an output of the camera-shake detection sensor 5" is supplied from the camera control microcomputer 6 to the target information amount control microcomputer 7 so as to control not to raise the target information amount than necessary. At this time, changing the filter coefficient of the filter computing unit 4 and removing high frequency components will further enhance the compressing efficiency of the encoding and compression apparatus 10 in a subsequent stage, making it possible to restrain deterioration of images even at a lower bit rate.

Furthermore, the degree of attention paid to an image drops during the panning mode, as in the case of the switching of the recording mode described in conjunction with FIG. 3 and FIG. 4, so that it is not required to obtain a sharp image with a higher resolution than necessary.

As explained above, the absolute amount of a bit stream output from the encoding and compressing apparatus 10 by the target information amount control microcomputer 7 can be reduced, permitting comfortable recording of more moving images with proper image quality in a medium with a limited recording capacity.

A specific example of the method for controlling the input signal/input information of the target information amount control microcomputer 7 will now be explained.

Figure 6:
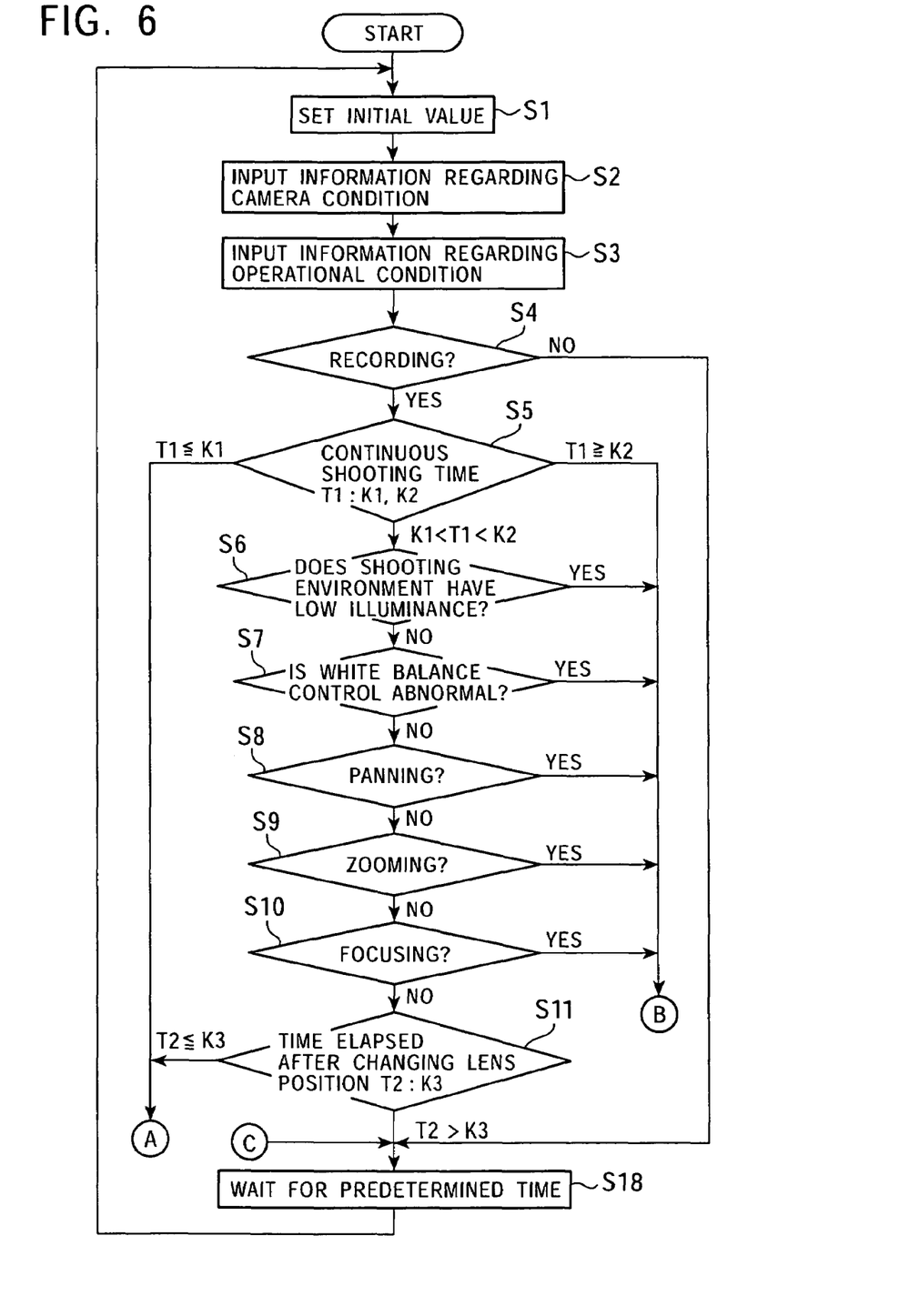
FIG. 6 is a flowchart showing an example of a control procedure (part 1).
Figure 7:
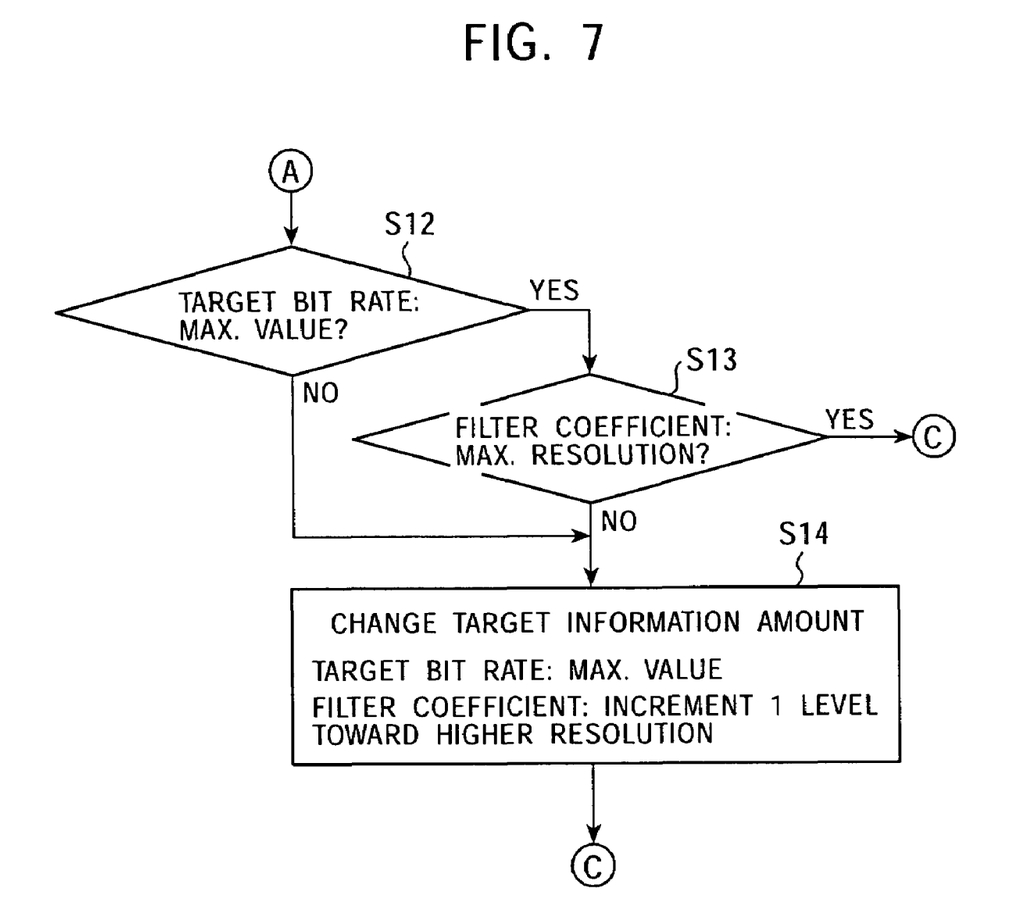
FIG. 7 is a flowchart showing an example of the control procedure (part 2).
Figure 8:
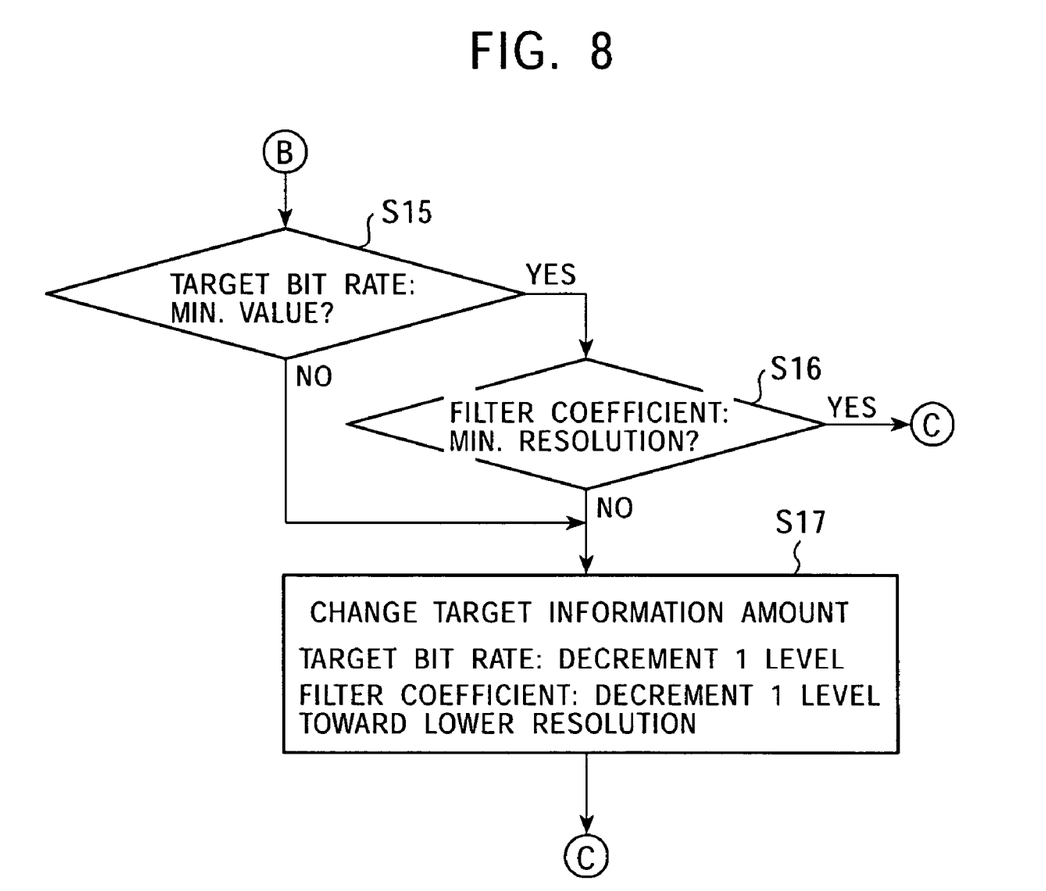
FIG. 8 is a flowchart showing an example of the control procedure (part 3).

FIG. 6 through FIG. 8 are flowcharts illustrating an example of a control procedure.

In step S1 shown in FIG. 6, initial values in the target information amount control microcomputer 7 are set immediately after power is turned ON. The initial values of the target information amount set in this step are the initial values of a target bit rate and a filter coefficient.

In step S2, information indicating the current condition of the camera is input from the camera control microcomputer 6. The information primarily includes the information regarding a zoom lens position, a focus evaluation value, an iris in/out amount, a camera signal gain amount, a change in white balance control amount, and a camera-shake detection value.

In step S3, the information indicating a user operational state is input from the human interface control microcomputer 8. The information primarily includes a recording mode signal, and the information regarding the time elapsed from the start of recording.

In step S4, it is determined, on the basis of a recording mode signal, whether recording into a recording medium is being carried out. If the signal indicates the recording mode RM, which means that the apparatus is in the middle of recording, then the procedure proceeds to step S5, or if the signal indicates the standby mode SBM, then the procedure proceeds to step S18 wherein it stands by. This is because a video recording/reproducing apparatus combined with a camera frequently starts actual recording from the moment attention is focused on an image to be taken.

In step S5, the time elapsed from the start of recording is determined by a measurement signal of a continuous shooting time T1. If the determination result indicates that the measured point is immediately following the start of recording (T1≦K1), then the procedure proceeds to step S12 (FIG. 7). If the determination result indicates that a sufficient time has elapsed from the start of recording (K2≦T1), then the procedure proceeds to step S15 (FIG. 8). In other cases (K1<T1<K2), the procedure proceeds to step S6. It is known as a common sense that continuing recording for a predetermined time (=K2) or more with no break causes the degree of attention of the photographer and also a viewer who will watch the reproduced images. As shown in FIG. 4, the average target information amount is decreased from the point at which the continual shooting time exceeds K2 (=t4−t1) after the recording was started.

In step S6, it is determined whether the shooting environment has a low illuminance on the basis of an iris in/out amount and a camera signal gain. If the iris 9 is fully open and if the camera signal gain amount is maximum (low-illuminance shooting), then the procedure proceeds to step S15 (FIG. 8). This is because, by utilizing the information regarding exposure correction by the target information amount control microcomputer 7, it is assumed that videotaping in a low-illuminance environment is expected in which the iris 9 is open and the gain of the imaging device 2 has been increased. If there is sufficient illuminance, then the procedure proceeds to step S7.

In step S7, it is determined whether the white balance is abnormal on the basis of the information regarding white balance. If it is determined that the white balance is abnormal, then the procedure proceeds to step S15 (FIG. 8). This is because, if the use of the information regarding white balance by the target information amount control microcomputer 7 indicates that the evaluation value of white balance deviates from a black body radiation curve, then it is determined to be unacceptable as an image. If the white balance is determined to be normal, then the procedure proceeds to step S8.

In step S8, it is determined on the basis of a camera-shake detection value whether the camera is panning. If the camera-shake detection value exceeds a predetermined value, then it is determined that the camera is panning, and the procedure proceeds to step S15 (FIG. 8). If no camera-shake is detected, then the procedure proceeds to step S9.

In step S9, it is determined whether the camera is zooming by checking a change of the position of the zoom lens. If the camera is zooming, then the procedure proceeds to step S15 (FIG. 8), or if the camera is not zooming, then the procedure proceeds to step S10.

In step S10, the magnitude of a focus evaluation value is checked to determine whether the camera is focusing. If the focus evaluation value is smaller than a focus threshold value, then it is determined that the camera is focusing, and the procedure proceeds to step S15 (FIG. 8); otherwise, the procedure proceeds to step S11. This is because the degree of attention of a photographer or the like on images is low in the middle of panning, zooming, or focusing. Especially during the panning, the correlative detection and the extraction of characteristics of an image in the conventional time domain lead to a decision that the image is moving, so that the target information amount is not set higher than necessary.

In step S11, an elapsed time T2 after the position of the zoom lens is changed is determined.

If the determination result indicates that the measured point is immediately following the start of zooming (T2≦K3), then the procedure proceeds to step S12 (FIG. 7), and in other cases (K3<T2), the procedure proceeds to step S18. This is because the degree of attention paid to an image increases at the recording immediately after zooming is started, so that the target information amount is preferably increased. Thereafter, with the elapse of time, the degree of attention decreases, so that the average target information amount is decreased at the point where the elapsed time T2 exceeds the predetermined time K3.

In step S12 shown in FIG. 7, it is determined whether the target bit rate is a maximum value. If the determination result indicates the maximum value, then the procedure proceeds to step S13; otherwise, the procedure proceeds to step S14.

In step S13, it is determined whether the filter coefficient has been set to a maximum resolution. If the determination result indicates the maximum value, then the procedure proceeds to step S18 (FIG. 6); otherwise, the procedure proceeds to step S14.

In step S14, the target information amount is changed. More specifically, the target bit rate is set to the maximum value, and the filter coefficient is incremented by one step in the direction for increasing the resolution, then the procedure proceeds to step S18 (FIG. 6).

In step S15 shown in FIG. 8, it is determined whether the target bit rate is a minimum value. If the determination result indicates the minimum value, then the procedure proceeds to step S16; otherwise, the procedure proceeds to step S17.

In step S16, it is determined whether the filter coefficient has been set to a minimum resolution. If the determination result indicates the minimum value, then the procedure proceeds to step S18 (FIG. 6); otherwise, the procedure proceeds to step S17.

In step S17, the target information amount is changed. More specifically, the target bit rate is decremented by one step and the filter coefficient is also decremented by one step in the direction for decreasing the resolution, then the procedure proceeds to step S18 (FIG. 6).

In step S18, the procedure stands by for a predetermined time, then returns to step S2.

The loop operation of the above flowchart is begun at predetermined intervals immediately after the power is turned ON, and stops when the power is interrupted. The loop time can be arbitrarily set; however, to control the target information amount for the MPEG2 standard model, it is difficult to change the target bit rate within 1 GOP (Group of Picture) unit, so that it is desirable to set a time of an integral multiple thereof. The magnitudes of the constants K1 through K3 in the determination steps 5, 11, etc. are decided by field tests under actual shooting conditions.

Thus, the video recording/reproducing apparatus combined with a camera and the recording control method therefor in accordance with the present invention provide an advantage in that the information from a control microcomputer that performs the drive of the lens of a video camera, the adjustment of exposure, and the detection of the white balance and a camera-shake by an angular velocity sensor, and make corrections, and the information from a human interface microcomputer that mainly controls the start and stop of the shooting of the video camera are taken into consideration so as to carry out optimum encoding control for a particular shooting scene in an MPEG2 standard model, thereby allowing more moving images to be recorded with an optimum image quality in a medium with a limited recording capacity.

The invention claimed is:

1. An imaging apparatus, comprising:
   shooting means for capturing an image signal;
   encoding means for encoding the image signal;
   recording means for recording the encoded image in a recording medium;
   first controlling means for outputting a first control signal that controls the shooting means;
   second controlling means for outputting a second control signal that controls the start and stop of shooting of the image signal; and
   third controlling means for outputting a third control signal that controls the encoding means,
      wherein the third control means controls an encoding-target information amount for the image signal based on the first control signal during the period from the start to the stop of shooting indicated by the second control signal, and
      wherein the encoding-target information amount is based on (a) an image condition relating to at least one of a luminance level and white balance of the image signal and (b) a camera-operation corresponding to the shooting means at least one of panning, zooming and focusing.

2. The imaging apparatus according to claim 1, wherein the third control means controls the encoding-target information amount for the image signal based on the time elapsed from the when the first control signal or the second control signal is outputted.

3. The imaging apparatus according to claim 2, wherein the third control means controls the encoding-target information amount for the image signal so that, when the elapsed time is less than or equal to a predetermined value, the encoding-target information amount is high, and when the elapsed time is more than the predetermined value, the encoding-target information amount is low.

4. A recording control method for an imaging apparatus, comprising:
   capturing an image signal;
   encoding the image signal;
   recording the encoded image in a recording medium;
   outputting a first control signal that controls capturing said image signal;
   outputting a second control signal that controls the start and stop of shooting of the image signal;
   outputting a third control signal that controls the encoding,
      wherein the third control signal controls an encoding-target information amount for the image signal based on the first control signal during the period from the start to the stop of shooting indicated by the second control signal; and
   controlling the encoding-target information amount based on (a) an image condition relating to at least one of a luminance level and white balance of the image signal and (b) a camera-operation of at least one of panning, zooming and focusing.

* * * * *